United States Patent [19]

Palazzetti et al.

[11] Patent Number: 5,003,259
[45] Date of Patent: Mar. 26, 1991

[54] MAGNETIC MONITORING DEVICE, PARTICULARLY FOR MONITORING THE PARAMETERS OF ANGULAR MOVEMENT OF ROTATING MEMBERS HAVING A PERIPHERAL IRREGULARITY

[75] Inventors: Mario Palazzetti, Avigliana; Carlo La Torre; Sergio Damiani, both of Torino, all of Italy

[73] Assignee: Fiat Auto S.p.A., Torino, Italy

[21] Appl. No.: 187,194

[22] Filed: Apr. 28, 1988

[30] Foreign Application Priority Data

Apr. 28, 1987 [IT] Italy .................. 67355 A/87

[51] Int. Cl.$^5$ .................. G01P 3/488; G01B 7/30
[52] U.S. Cl. .................. 324/207.14; 73/519; 324/174; 324/207.25
[58] Field of Search .................. 324/173, 174, 207, 208; 310/155, 168; 73/517 R, 518, 519; 341/15; 188/181 R

[56] References Cited

U.S. PATENT DOCUMENTS

| | | | |
|---|---|---|---|
| 3,359,492 | 12/1967 | Kuhrt et al. | 324/208 X |
| 3,366,874 | 1/1968 | Kuhne | 324/174 X |
| 3,526,796 | 9/1970 | Blitchington et al. | 310/155 X |
| 3,626,344 | 12/1971 | Shaternikov et al. | 324/230 X |
| 3,961,214 | 6/1976 | Lokkart | 324/174 X |
| 3,980,913 | 9/1976 | Peterson . | |
| 4,053,826 | 10/1977 | Wasawa et al. | 324/208 |
| 4,180,753 | 12/1979 | Cook, II | 324/174 X |
| 4,205,797 | 6/1980 | Bennett, Jr. et al. | 324/208 X |
| 4,700,133 | 10/1987 | Day | 324/174 X |
| 4,745,363 | 5/1988 | Carr et al. | 324/174 X |

FOREIGN PATENT DOCUMENTS

| | | | |
|---|---|---|---|
| 613185 | 1/1961 | Canada | 324/174 |
| 34821 | 9/1981 | European Pat. Off. . | |
| 2748070 | 4/1978 | Fed. Rep. of Germany | 324/173 |
| 3326477 | 1/1985 | Fed. Rep. of Germany . | |
| 2112298 | 6/1972 | France . | |
| 2368830 | 5/1978 | France . | |
| 2386039 | 10/1978 | France . | |
| 1188521 | 10/1985 | U.S.S.R. | 324/229 |

OTHER PUBLICATIONS

Elphee, E. K., Tachometry in Industry, Industrial Electronics, Nov. 1963, pp. 713-715.

Primary Examiner—Gerard R. Strecker
Attorney, Agent, or Firm—Sughrue, Mion, Zinn, Macpeak & Seas

[57] ABSTRACT

The invention relates to monitoring techniques, such as angular movement monitoring techniques, in which an element with at least one peripheral irregularity is moved relative to a magnetic circuit so as to induce a variation in the reluctance in the magnetic circuit which can be detected externally. A device is disclosed including two magnetic elements defining respective magnetic circuits symmetrical with each other. Between the two magnetic members a gap is formed of approximately the same size of a peripheral irregularity, consisting of a notch or a tooth of a moving member, which is passed in front of the two magnetic circuits to cause a corresponding variation in reluctance in the magnetic circuits which produce a disturbance in the characteristics of symmetry, detectable by a sensor preferably a Wiegand-effect sensor.

12 Claims, 3 Drawing Sheets

MAGNETIC MONITORING DEVICE, PARTICULARLY FOR MONITORING THE PARAMETERS OF ANGULAR MOVEMENT OF ROTATING MEMBERS HAVING A PERIPHERAL IRREGULARITY

BACKGROUND OF THE INVENTION

The present invention relates to monitoring techniques using magnetic circuits in which relative movement is produced between a magnetic circuit and at least one element with a peripheral irregularity and the passage of the peripheral irregularity near the magnetic circuit produces a variation in relunctance in the magnetic circuit which is detectably externally.

Such monitoring techniques are used, for example, in so-called phonic wheels, which are employed to an ever increasing extent in revolution counters, tachometers, etc. A particularly important field of possible use is the automotive sector in which phonic-wheel sensors can be used to detect the rate of rotation of the engine and/or of the wheels in association with electronic ignition and injection systems, automatic gear changes, anti-lock braking systems (ABS). . .

According to a current solution, to which FIG. 1 relates, a monitoring device indicated 1, with a magnetic circuit, is arranged in a position facing the edge of a disc D keyed on to a shaft W whereof it is wished to detect one or more parameters of angular movement, such as the position, the speed, the acceleration. For this purpose, the disc D is provided around its periphery with one or more irregularities consisting, for example, of a notch T, a hole, etc. The disc D is made entirely, or at least in the region adjacent the peripheral irregularity T, from a material which has a certain degree of magnetic permeability, typically a mild ferromagnetic material.

When the irregularity T passes in front of the sensor 1 as a result of the rotation of the disc D, it causes the reluctance in the magnetic circuit of the sensor 1 to vary. This variation in reluctance can be detected so as to cause the emission of an output signal, generally consisting of a train of pulses, on an output line 2. Each pulse indicates the transit of the peripheral irregularity T in front of the sensor 1. As the geonetrical parameters of the disc D are known, it is possible to deduce the angular position, the speed and the angular acceleration of the shaft W from the position of the pulses and their frequency of repetition.

The graph of FIG. 2 shows, by way of example, a typical time trace of the output signal $V_{out}$ detectable at the output 2 of an electromagnetic sensor of known type.

This signal is indicative of the temporal variation $\delta\phi/\delta t$ in the flux $\phi$ which flows through the electromagnetic detector. This flux varies periodically, as stated, due to the periodic variation in reluctance induced by the transit of the peripheral irregularity T in front of the sensor 1.

The signal trace indicated $V_1$ in FIG. 2 is more than anything, a theoretical model. In reality, phenomena such as production tolerances in the disc D, its assembly in a slightly eccentric position relative to the shaft W, permanent deformations of the disc D or temporary deformations induced by vibrations, or non-homogeneity of the magnetic characteristics of the material constituting the disc disturb the output signal of the sensor 1.

Generally the aforementioned phenomena give rise to variations in the width of the air gap formed by the irregularity T during its passage in front of the sensor 1 or to anomalous fluctuations in the magnetic flux in the detector. Consequently, the reluctance of the magnetic circuit of the detector is modulated correspondingly and this is converted into a modulation (for example of sinusoidal type, as in the example illustrated by a broken line and indicated $V'_1$ in FIG. 2) of the output signal detectable on the line 2. This modualtion makes it more difficult to detect the position of the signal pulses correctly. Errors can therefore be produced in the determination of the position of the pulses, which are expressed—in some cases very seriously due to propagation—as corresponding operational errors in the system in which the sensor is installed.

In order to avoid such drawbacks so-called differential sensors have been developed.

In such sensors, which are known, for instance, from FR-A-2 112 298 and FR-A-2 386 039 (corresponding to GB-A-1 302 507 and GB-A-1 595 680, respectively), two adjacent magnetic circuits are formed with charactertistics of symmetry in at least one region and relative movement between the two magnetic circuits and the element with the at least one peripheral irregularity (i.e. the phonic wheel) is then caused so that the peripheral irregularity passes near the two magnetic circuits in sequence causing corresponding variations in reluctance in the magnetic circuits which can cause in the characteristics of symmetry in the at least one region a disturbance which can be detected externally thus monitoring the speed of said relative movement.

A basic drawback of the sensors of the prior art is that they are generally adapted for operating in conjuction with a moving element (i.e. a phonic wheel) having a substantially continuous plurality of irregularities (notches, holes, etc.) and cannot be used in a reliable manner together with a moving element having just one or several, spaced apart irregularities such as is the case of monitoring assemblies used for monitoring the angular position or phase of a rotating shaft. Moreover in certain arrangements such as disclosed in FR-A-2 112 298 a precise relationship must exist between the dimensions of the sensor and the dimensions of the irregularities of the phonic wheel. This means that one kind of sensor can be used in conjunction with one type of phonic wheel only, which may be quite unpractical in a number of applications such as those in the automotive field.

SUMMARY OF THE INVENTION

The inherent problem of the present invention is that of avoiding the drawbacks outlined in the foregoing, while providing a sensor which is of compact size, intrinsically rugged and protected against electromagnetic disturbances.

According to the present invention that problems is solved using a device including two magnetic members defining a central gap of the device whose dimensions (width) are about the same, and preferably not less than those of the irregularity of the element (phonic-wheel) with which the device is intended to operate.

In the present description and in the claims which follow, the expression "magnetic sensor" is intended to extend to any type of magnetic flux sensor which can detect a variation in magnetic characteristics in a region in which the sensor itself is mounted and which can output a signal indicative of this disturbance.

In the invention, the use of sensors consisting, for example, of a coil connected to an integrator, which can provide a voltage proportional to the flux in the presence of the disturbance, or a Hall effect sensor, or even a Wiegand effect sensor, is envisaged.

These sensors behave differently under the effect of the magnetic flux and thus give rise to devices with different properties.

The use of Wiegand-effect sensors, which are described, for example, in U.S. Pat. No. 3 892 118, has already been suggested in the field of rotational-rate sensors, such as revolution counters. According to this proposal, made according to a design essentially the same as that illustrated in FIG. 1, the Wiegand-effect sensor faces the periphery of a disc on which permanent magnets in the form of small bars are provided instead of peripheral irregularities. These magnets are oriented in alternating sequence around the periphery of the disc, so as to cause successive switchings of the Wiegand-effect sensor as the disc rotates. This solution, however, is made problematical and expensive by the need to mount magnets on the disc.

Reference can be made in respect of the foregoing also to the disclosure of EP-A-0 034 821.

It can be seen that the embodiment according to the invention is substantially unaffected by the disturbances described above, to the extent that the adjacent, symmetrical magnetic circuits according to the invention are affected identically by the disturbances. For this reason, these disturbances do not cause any unbalance in the symmetry of the two circuits and, consequently, do not cause any input signal. Such a signal is caused, but solely by the passage of the peripheral irregularity in front of the sensor.

BRIEF DESCRIPTION OF THE DRAWINGS

Further characteristics and advantages of the invention will become clear from the description which follows, given purely by way of non-limiting example, with reference to the appended drawings, in which.

DETAILED DESCRIPTION OF THE INVENTION

Figure 1:
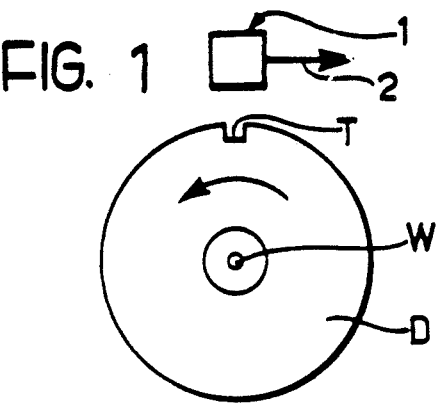
FIGS. 1 and 2 have already been considered above.
Figure 2:
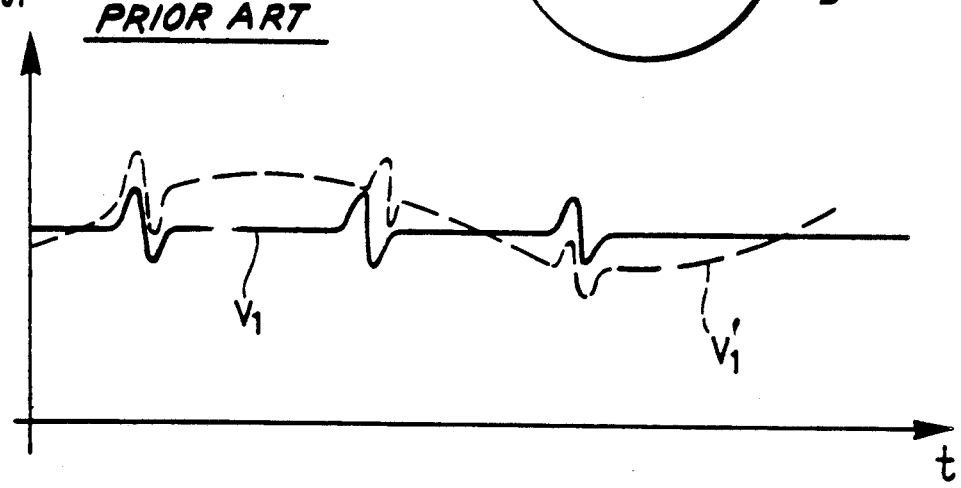

The sensor according to the invention, generally indicated 10 in FIG, 3, is intended to be used with the same general criteria described above with reference to FIG. 1.

The sensor 10 includes two elongate members 12, 14 of material with a high magnetic permeability extending parallel to each otheR in a direction perpendicular to the direction of transit of the peripheral irregularity (notch T) of the disc D in front of the sensor 10.

The members 12 and 14 preferably have respective homologous end 12a, 14a converging towards each other to form an air gap 16 intended to face the notch T in the disc D and having dimensions generally of the same order and, preferably, not less than those of the notch T itself.

Of course, reference is made herein to the transversal dimensions (or width) of both the gap 16 and the notch T, i.e. the dimensions in the direction of relative movement of the gap and the notch.

Two permanent magnets 18 and 20, whose directions of polarization (indicated symbolically in the drawings by the letter N=North and S=South) and selected to be homologous, are corrected to the members 12 and 14 at their ends opposite those defining the air gap 16. In other words, both the members 12 and 14 are connected either to the north poles or to the south poles of the magnets 18 and 20.

The permanent magnets 18 and 20 therefore induce wholly-identical magnetic fields in the members 12 and 14 (which will consequently termed in the following "magnetic" elements or members even though not being necessarily constituted by a magnetic material).

Figure 3:
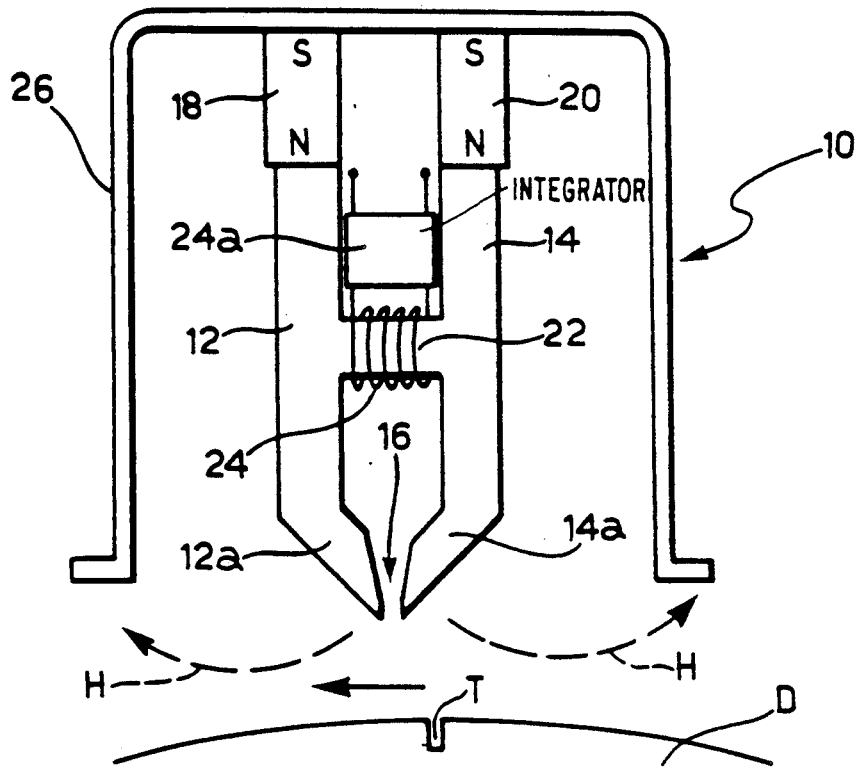
FIG. 3 illustrates schematically the structure of a sensor device produced in accordance with the invention, in which a coil connected to an integrator is provided as the magnetic flux detector.

In the embodiment illustrated in FIG. 3, the members 12 and 14 are connected together by a transverse magnetic-circuit arm 22 which, together with the members 12 and 14, forms a generally H-shaped structure.

An electrical wire is wound around the transverse circuit arm 22, forming a detector coil 24, connected to an integrator 24a, intended to act as a magnetic-flux sensor according to criteria which will be better explained below.

The unit formed by the members 12, 14, the magnets 18 and 20 and the arm 22 is enclosed in a cover 26 of material with a good magnetic permeability, which surrounds the unit but is open on that side of the sensor intended to face the disc D, that is, the side at which the ends 12a and 14a of the members 12 and 14 jointly form the air gap 16. The cover 26 which is in contact with the magnets 18 and 20 and may possibly show a break in continuity between the magnets (see FIGS. 10 and 12) thus "closes" the magnetic fields present in the members 12 and 14 between each end 12a, 14a and the part of the cover which each end is adjacent. This effect of closure of the two magnetic fields is illustrated schematically by the arrows shown in chain line and indicated H in FIG. 3.

It is worth pointing out that providing cover 26 is not—per se—essential for the invention inasmuch as the two magnetic fields actually "close" themselves as indicated even in the absence of cover 26. Providing cover 26 is however preferred in order to ensure a compact structure, which is intrinsically rugged and protected from electromagnetic disturbances. Cover 26 constitutes, in fact, a casing surrounding the two magnetic memebers 12 and 14, while having a front opening towards the region through which the notch T moves.

In the device 10 there are therefore two symmetrical magnetic fields whose lines of flux extend respectively:

from the magnet 18 through the member 12 to the end 12a and from this to the adjacent portion of the cover 26, then to form a closed loop through the cover 26 itself back to the magnet 18, and from the mnagnet 20 through the member 14 to the end 14a and from this to the adjacent portion of the cover 26, then to form a closed loop through the cover 26 itself back to the magnet 20.

By virtue of this symmetrical distribution of the magnetic fields, there is practically no field in the arm 22 constituting the middle portion of the detector H structure.

The only event which can disturb the symmetry of the two magnetic fields in question is the passage of the peripheral irregularity, or the notch T, of the disc D in front of the air gap 16.

The passage of the notch T in front of the air gap 16 in fact has the effect of causing a differentiated disturbance in reluctance, first in one and then in the other magnetic circuit.

This phenomenon is illustrated by FIGS. 4 to 9.

FIGS. 4 to 8 show the sequence of possible positions reached by the notch T in its transit in front of the air gap 16.

The movement of the notch T is assumed to occur from right to left in the drawings.

Figure 4:
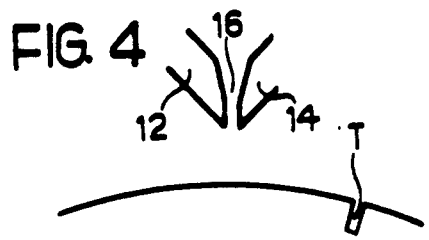
FIGS. 4 to 8 and 9 illustrate the operating criteria of the device of FIG. 3 in greater detail.
Figure 5:
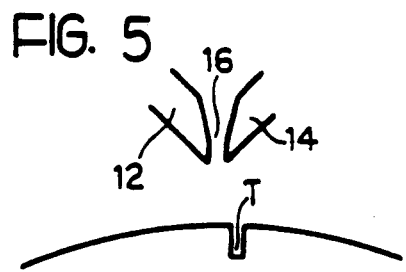

In the positions illustrated in FIGS. 4 and 5, as it gradually approaches the air gap 16, the notch T causes a more marked variation in the reluctance (and therefore in the flux) in the magnetic circuit of the member 14 than in the adjacent magnetic circuit defined by the member 12, which is further away.

Figure 6:
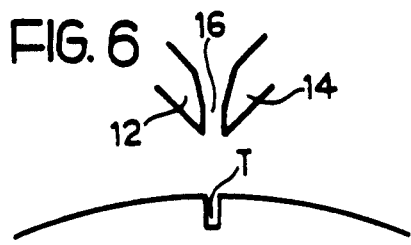
Figure 7:
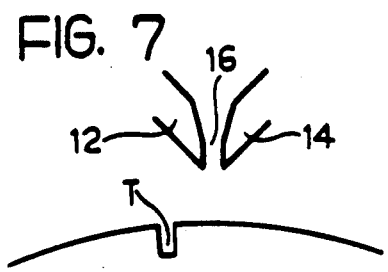
Figure 8:
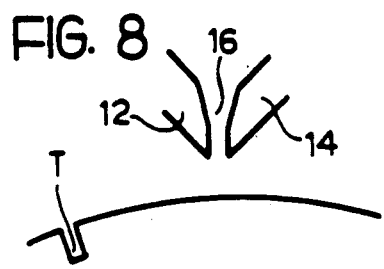

When it reaches the position of alignment with the air gap 16 illustrated in FIG. 6, a condition of equilibrium between the two magnetic field is momentarily re-established; the notch T in fact affects the reluctance of both the magnetic circuits identically. As it moves gradually away from ther air gap 16 towards the left, as illustrated in FIGS. 7 and 8, the relative situations of the magnetic circuits are exactly the opposite of those of FIGS. 4 and 5. The notch T in fact causes a more marked variation in the reluctance (and hence in the flux) in the magnetic circuit defined by the member 12 than in the magnetic circuit defined by the member 14.

As a whole, the passage of the notch T in front of the air gap 16 has the effect of producing a momentary imbalance in the two magnetic circuits. This imbalance is detected by the coil 24 connected to the integrator 24a due to the magnetic field in the arm 22 being momentarily other than zero.

Figure 9:
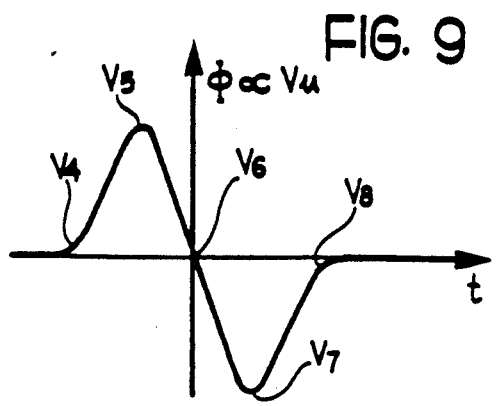

The graph of FIG. 9 illustrates, purely qualitatively, a possible trace of the signals: magnetic flux $\phi$ and output voltage $V_u$ detectable at the ends of the coil 24 connected to the integrator due to the pasaage of the notch T in front of the air gap 16.

In particular, values indicated $V_4$, $V_5$, $V_6$, $V_7$, $V_8$ of the output signal $V_u$ are detectable at moments when the notch T is in the position relative to the air gap 16, illustrated in the drawing, whose number corresponds to the subscript of the letter V.

The waveform of the output signal $V_u$ is generally symmetrical relative to the origin. In particular, the signal $V_u$ crosses zero (zero crossing) exactly when the notch T passes in front of the air gap 16.

None of the disturbances described in the introduction of the description affect, the zero crossing of the output signal $V_u$ in any way in so far as they do not alter the conditions of symmetry of the two magnetic circuits defined by the members 12 and 14.

A sensor is therefore available which has a high degree of ability to reject this type of disturbance. In particular the output signal does not have undulations of the type shown by the signal $V'_1$ of FIG. 1 as a result of modulation of the width of the air gap h which separates the sensor from the notch T.

In this respect, it in fact suffices to note, with reference to FIGS. 3 to 8, that a variations in the distance separating the notch T from the ends of the members 12 and 14 at the most affects the amplitude of the output signal $V_u$ but does not affect its characteristics of symmetry nor, above all, the position of the zero-crossing point.

The position of this point can thus be detected precisely within tolerances of the same order of the notch width. The sensor of the type described has the further advantage over conventional ones of an ability to detect the sense of rotation of the disc D.

As a possible alternative to the use of the coil 24 connected to an integrator, a Hall-effect magnetic sensor can, for example, be used as the sensor.

According to another embodiment, a Wiegand-effect sensor can be used to detect the disturbance in the symmetry of the two magnetic fields present in the members 12 and 14.

Figure 10:
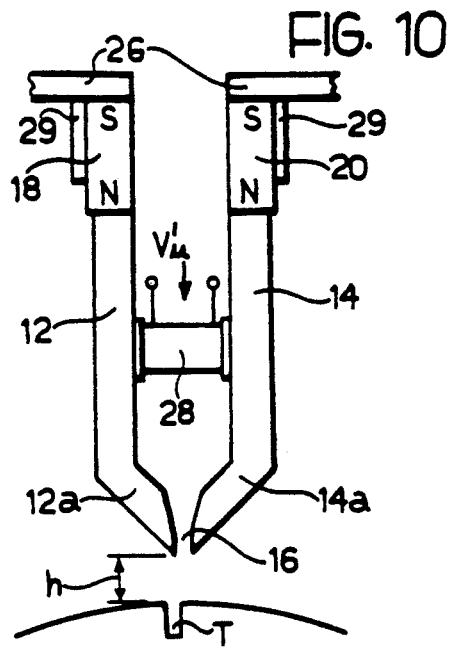
FIG. 10 illustrates schematically a variant of the invention which uses a Wiegand-effect sensor, for example, of symmetrical type.

This sensor (known per se) can be produced in the form of a small bar 28 which can be mounted as a bridge between the two members 12 and 14 according to the embodiment illustrated in FIG. 10. The detector circuit is therefore, again in this case, generally in the form of an H to which have been added two ferromagnetic movable plates 29, by means of which it is possible to optimize the working conditions of the Wiegand element.

As is known, a Wiegand-effect sensor consists essentially of one or more magnetic wires of some homogeneous nickel-iron or vanadium-cobalt-iron alloys which, having been worked and tempered, have an outer region with a much greater coercive force (by a factor of 5 or more) than the interior. In other words, the outer region requires a much greater magnetic field to switch its direction of magnetization than that necessary to switch the direction of magnetization of the interior.

The switching of the Wiegand element can be caused by an external magnetic field. This phenomenon gives rise to a voltage pulse at the ends of a coil placed near to or wound on the wire itself.

Figure 11:
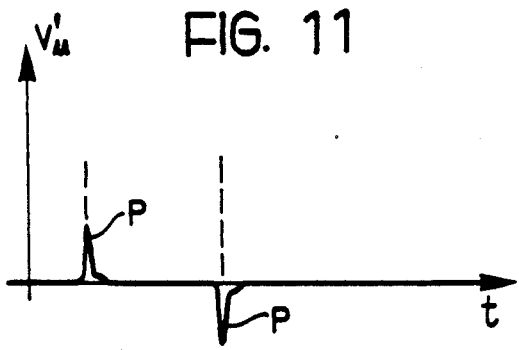
FIG. 11 illustrates a typical time trace of the detection signal obtainable with the sensor of FIG. 10.
Figure 12:
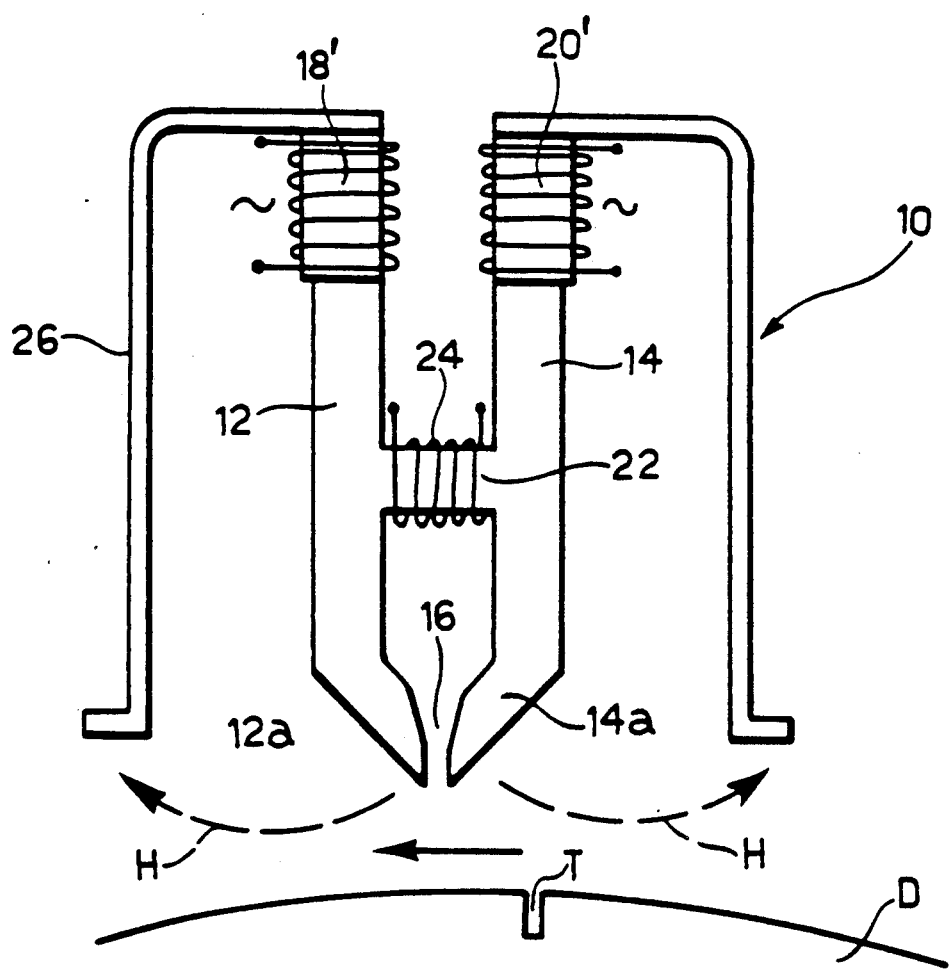
FIG. 12 illustrates schematically another variant of the invention which uses two electromagnets supplied with high-frequency, alternating current instead of two permanent magnets to generate the field of the detector.

One of the advantages of the use of a Wiegand-effect sensor 28 in the device according to the invention results from the fact that the voltage detectable at the output of such a sensor is pulsed and is of the type indicated $V'_u$ in FIG. 11, which relates to the use of the Wiegand element in its "symmetrical" form. In this signal, the amplitude of each pulse P is virtually independent of the characteristics of the magnetic field which has caused the sensor to switch. In other words, the use of a Wiegand-effect sensor makes it possible to obtain a pulsed signal consisting of two peaks, one positive and one negative, in correspondence with the passage of the notch T in front of the prongs 12 and 14 of the sensor of FIG. 10. As illustrated in FIG. 12, another version of the device is also possible, which is arranged to operate under load. In this version, the pair of magnets 18, 20 are replaced by two electromagnets 18', 20' (supplied at high frequency) which constitute the primary of a transformer, whose secondary is represented by the coil wound on the transverse arm 22 of FIG. 12. This transformer is characterised by a mutual inductance which is nil in conditions of symmetry (that is when the notch T is remote from the air gap 16) but has a considerable value when it is near to the air gap. This transformer, when inserted in a suitable circuit (the prior art provides innumerable ones), allows a signal with the following characteristics to be obtained:

(1) it can operate with ferromagnetic or conducting materials;
(2) it can operate in static conditions (works as in proximity);
(3) it allows a particular rejection of electromagnetic interference to be achieved.

The signals proportional to the flux, before being transformed into pulses by a trigger, can undergo suitable transformations by means of analogue circuits to improve the signal/interference ratio even further. In some cases it is particularly useful to process the signal derived. In this case the use of the sensor with a flux detector achieved by means of a coil is particularly useful due to the fact that it carries out this operation spontaneously or is sufficient to exclude the integrator envisaged downstream of the coil itself.

Finally, it can be seen that disturbances of a vibrating character, which cause the two prongs of the sensor to approach the disc D and move away from it symmetrically do not give rise to any interference signal.

Naturally, the principle of the invention remaining the same, the details of realization can be varied widely with respect to those described and illustrated, without thereby departing from the scope of the present invention as defined in the annexed Claims. In particular, according to the terminology adopted in the claims which follow, it suffices for the two magnetic circuits of the detector, even if they are not entirely symmetrical with each other, to have characteristics of symmetry in at least one region in which there is inserted a sensor element which can detect the disturbances in the symmetry characteristics induced by the passage of the peripheral irregularity T of the disc in front of the device 10.

What is claimed is:

1. A magnetic monitoring device adapted for use with a rotating element having at least one peripheral irregularity, the device comprising:

two magnetic members, each defining at least in part, a respective one of two adjacent magnetic circuits with characteristics of symmetry in at least one region;

said two magnetic members having two homologous ends adapted to face the periphery of the rotating element with said peripheral irregularity and defining between them a central air gap having a width of the same order as that of said peripheral irregularity;

magnet means coupled to ends of said magnetic members opposite said homologous ends for generating magnetic flux in said magnetic circuits whereby passage of said peripheral irregularity near said two magnetic circuits in sequence causes variations in reluctance in the magnetic circuits which produces a disturbance in the characteristics of symmetry in said region;

a magnetic circuit arm connected between said two magnetic members in said region and having a substantially zero magnetic field in the absence of the disturbance; and magnetic sensor means associated with said arm for producing a signal indicative of the disturbance of the characteristics of symmetry by sensing change in said magnetic field of said magnetic circuit arm caused by said disturbance.

2. A device according to claim 1, wherein said air gap has a width not less than the width of said peripheral irregularity.

3. A device according to claim 1, wherein said magnetic sensor means comprises an electrical coil associated with said arm through which an electric current can flow when induced by a change in the magnetic field of said arm caused by the presence of the disturbance.

4. A device according to claim 1, wherein said sensor means is a Hall-effect sensor.

5. A device according to claim 1, wherein said sensor means is a Weigand-effect sensor.

6. A device according to claim 1, wherein the magnetic members and the magnetic circuit arm jointly define an H-shaped structure.

7. A device according to claim 1, wherein each of the two magnetic members carries a respective associated magnet means with the polarities of the magnet means being homologous with each other.

8. A device according to claim 7, wherein said magnet means are permanent magnets.

9. A device according to claim 7, wherein said magnet means are electromagnets energized at high frequencies.

10. A device according to claim 9, wherein said magnetic sensor means comprises an electrical coil associated with said arm and each electromagnet includes a coil wherein the coil of at least one electromagnet and the electrical coil define the primary winding and secondary winding of a transformer, respectively.

11. A device according to claim 1, further comprising covering means of magnetizable material in the form of a casing substantially surrounding said two magnetic members and said magnet means, said covering means constituting part of each magnetic circuit.

12. A device according to claim 11, wherein said covering means has a break in continuity between said magnet means associated with said two magnetic members.

* * * * *